(No Model.)

T. R. LA DUE.
WAGON SPRING.

No. 324,263. Patented Aug. 11, 1885.

Witnesses:
Charles H. Campbell
Sumner Collins

Inventor:
Thomas R. La Due
by Geo. H. Lothrop
atty

UNITED STATES PATENT OFFICE.

THOMAS R. LA DUE, OF CARSON CITY, MICHIGAN.

WAGON-SPRING.

SPECIFICATION forming part of Letters Patent No. 324,263, dated August 11, 1885.

Application filed December 5, 1884. (No model.)

*To all whom it may concern:*

Be it known that I, THOMAS R. LA DUE, of Carson City, in the county of Montcalm and State of Michigan, have invented a new and useful Improvement in Wagon-Springs, of which the following is a specification.

Figure 1:
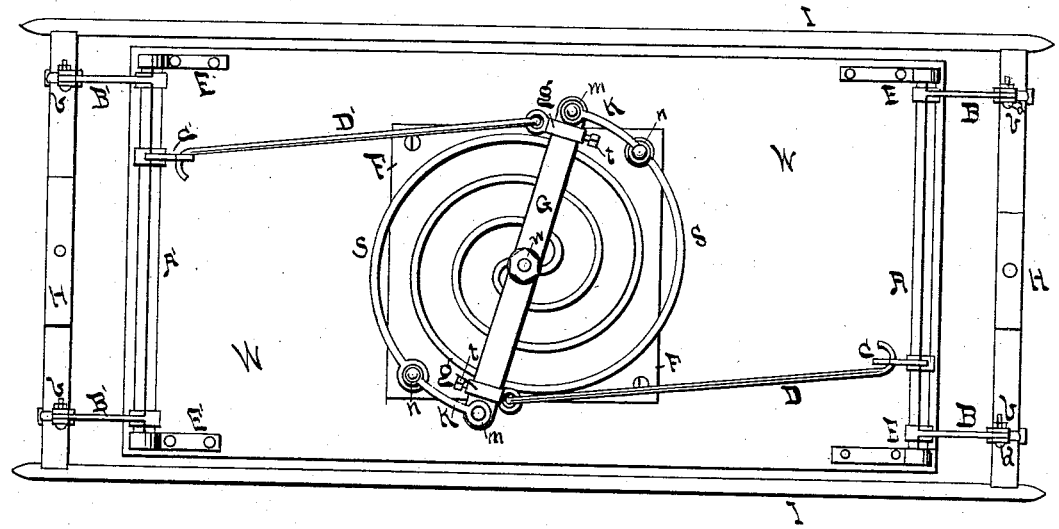
Figure 2:
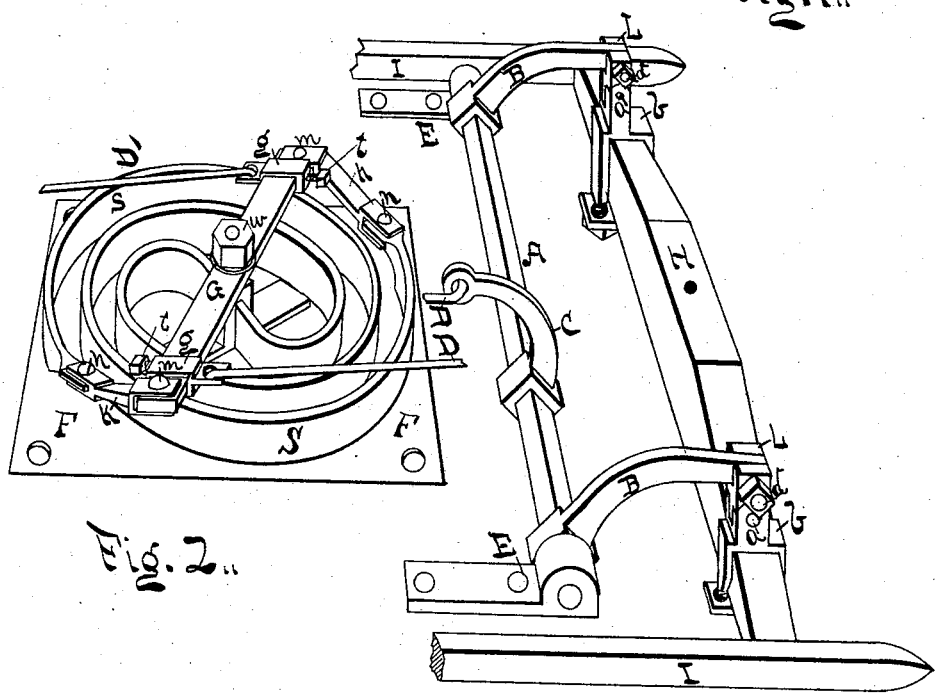

Figure 1 is a plan view of the bottom of the buggy-box, side bars, and bolsters, and Fig. 2 is a perspective of the spring and connections of the box to the forward bolster.

My invention consists in an improvement in wagon-springs, fully pointed out in the claims.

W represents a buggy-box, I I the side bars, and H H the bolsters, which are secured to the front and rear axles.

E E' represent four lugs, each having a bearing formed therein, two of which are fastened to the bottom of the box at each end.

A A' represent two iron bars, which are practically equalizing-bars, one of which is journaled in the bearings of the two lugs E E at each end of the box, so as to turn therein.

B B' represent four levers, two of which are fastened to each bar A, so as to turn therewith, and project to the bolsters at each end. These levers are preferably curved, as shown in the drawings.

C C' represent two levers, one of which is fastened to each bar A, so as to turn therewith, extending downward, and preferably curved somewhat toward the center of the buggy. At the end of each lever C is formed an eye to receive the end of a connecting-rod.

b b b b represent four clips, two of which are fastened to each bolster opposite the ends of the levers B B'. To the clips b b on one or both of said bolsters, either front or rear, as desired, are pivoted two short swinging links, L L, by the pivots a. To these swinging links on one bolster the ends of the levers B B' are pivoted by the pivots d d, and the ends of the levers B B' at the other end of the buggy are similarly pivoted directly to the clips b b. The object of the swinging links is simply to allow for the increased length of the box and connections as the box falls, so that it is evident that while said links may be used at both ends it is only necessary to use them at one end.

F represents a plate of iron securely fastened to the buggy-box at about its center.

S represents a spring, which may be fastened at its center to plate F, as shown in the drawings, thus leaving both ends free to operate; or one end of the spring may be so fastened and only one end left free whenever it is only necessary to use a light spring.

G represents a lever, which is pivoted at its center to the plate F, at the point where the spring S is secured thereto, by a pivot, w.

K K represent two connecting-links, which are pivoted to the ends of spring S by pivots n n, and to the ends of the lever G by pivots m m.

g g represent two clips on lever G, one at each side of the center thereof, and each provided with a set-screw, t, by which it may be securely fastened at any point on said lever. Each clip g is provided with an eye to receive the end of a connecting-rod.

D D' represent two connecting-rods, each of which connects one clip g with one of the levers, C.

The operation of my invention is as follows: The different parts being secured in position, as shown in the drawings, the spring S holds the box in position. When a weight is placed in the box, it tends to depress the box in a vertical line. As the levers B B' are rigidly fastened to the bars A A' at one end, and at the other end are pivoted to the clips b b, which are supported by the bolsters, only the inner end of said levers can descend with the box, and in so doing they force the bars A A' to turn on their axes in the bearings in lugs E E. As the bars A A' turn they force the levers C C' to turn with them, and as the ends of said levers move they draw the connecting-rods D D and swing lever G on its pivot. This compresses the spring S, because its ends are compelled to follow the ends of lever G, and the action of the spring tends to force the box back to its original position. The tension of the spring also holds all the pivots and the connecting-rod strained, so that rattling is prevented.

By this invention I am enabled to use a comparatively cheap spring. Both ends of the box are forced to move in the same way, thus avoiding the pitching incident to the use of elliptic end springs or the springs commonly used in side-bar buggies. A much longer, and consequently easier, spring can be used than can now be put under side-bar buggies, and the motion of the lever G around its pivot constantly tends to reduce the effective length thereof, while the leverage which the spring has thereon is not so reduced, because the ends of the spring are free to follow the motion of the lever, and thus preserve a sensibly equal distance from their points of draft to the center of the lever.

What I claim as my invention, and desire to secure by Letters Patent, is—

1. In combination with a buggy-box, an equalizing-bar journaled in bearings at each end thereof, mechanism, substantially such as described, adapted to cause said equalizing-bars to rotate when the box moves in a vertical direction, a lever rigidly fastened to each equalizing-bar, a coil-spring fastened to the buggy-box, and a connecting-rod fastening each of said levers to the free end or ends of said spring, substantially as shown and described.

2. In combination with a buggy-box, an equalizing-bar at each end thereof, journaled in bearings secured to the box, two levers rigidly secured to each equalizing-bar and having their outer ends pivoted to clips secured to the bolsters, and a lever rigidly secured to each equalizing-bar, and having its end connected with the free end of a coil-spring secured to the under side of the box, substantially as shown and described.

3. The combination, with a buggy-box, of a coil-spring secured thereto, and having its free end connected with an equalizing-bar at each end of the box, substantially as shown and described.

4. The combination of the box W, lugs E E', equalizing-bars A A', levers B B', clips b b and swinging links L L, levers C C', connecting-rods D D', lever G, and spring S, substantially as shown and described.

5. The combination of the levers C C', connecting-rods D D', adjustable clips g g, pivoted lever G, and spring S, substantially as shown and described.

6. The combination of the box W, plate F, spring S, pivoted lever G, pivoted connecting-links K K, adjustable clips g g, with set-screws t t, connecting-rods D D', levers C C', equalizing-bars A A', lugs E E', levers B B', bolsters H H, clips b b b b, and swinging links L L, pivoted to the clips on one of said bolsters, substantially as shown and described.

THOMAS R. LA DUE.

Witnesses:
FRED LADUE,
H. E. HOLBROOK.